UNITED STATES PATENT OFFICE.

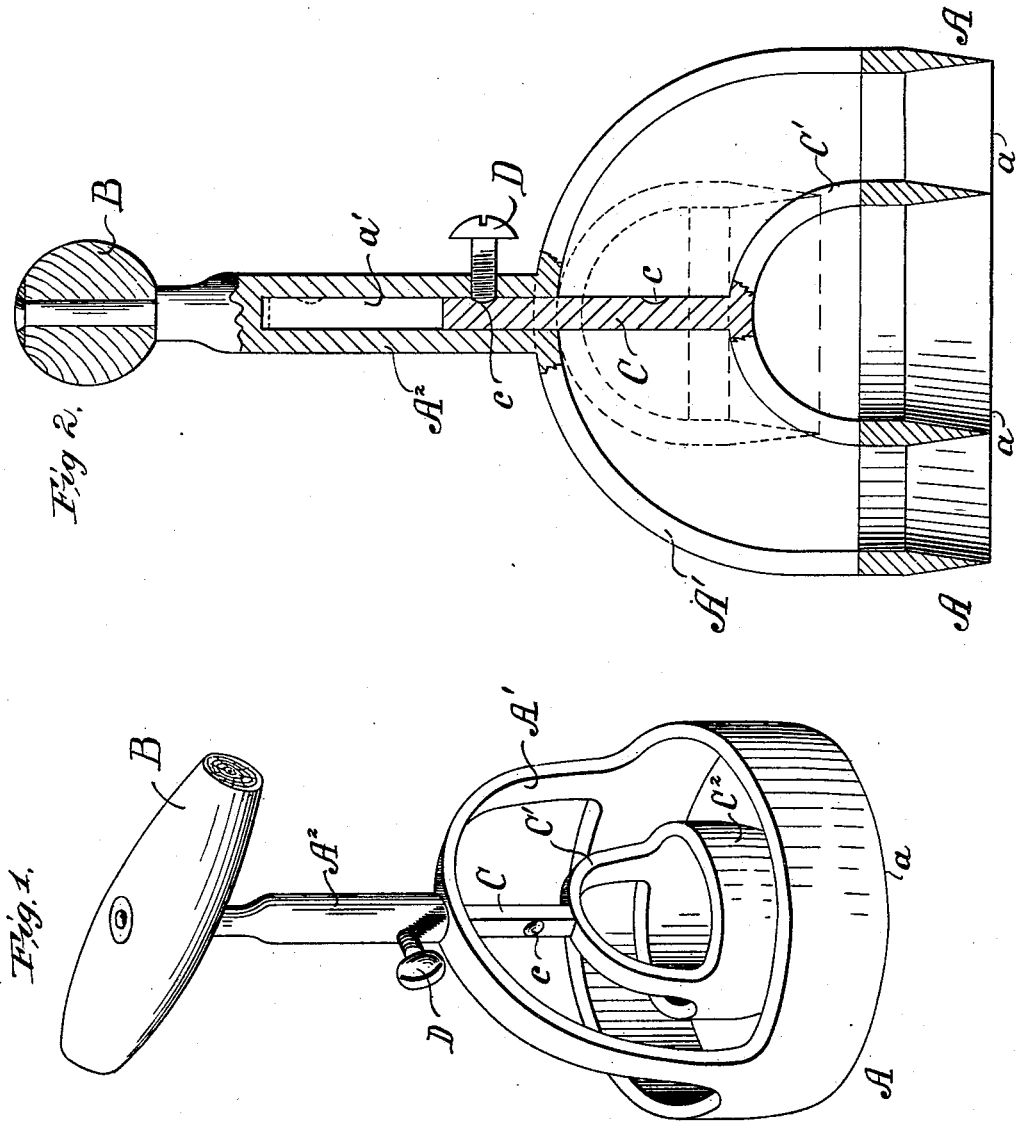

JOHN ADDISON BONE, OF MAYGERS, OREGON.

FOOD-CUTTER.

SPECIFICATION forming part of Letters Patent No. 700,725, dated May 27, 1902.

Application filed May 29, 1901. Serial No. 62,311. (No model.)

*To all whom it may concern:*

Be it known that I, JOHN ADDISON BONE, a citizen of the United States, and a resident of Maygers, county of Columbia, and State of Oregon, have invented certain new and useful Improvements in a Combined Chopping and Cutting Implement, of which the following is a specification, reference being had to the accompanying drawings, forming a part thereof, in which similar letters of reference indicate corresponding parts.

This invention relates to a combined chopping and cutting implement, the object thereof being to provide an improved article of this character which embodies a considerable length of cutting-surface within a small area and which is adapted for quickly and effectually chopping meats, vegetables, fruits, &c., and for cutting biscuits or cakes.

The device is simple in construction, durable, and inexpensive, and it can be easily cleaned and sharpened.

The invention will be hereinafter fully described, and specifically set forth in the annexed claim.

In the accompanying drawings, forming part of this specification, Figure 1 is a perspective view of my improved implement, and Fig. 2 a vertical sectional elevation thereof.

In the practice of my invention as illustrated by the drawings I employ primarily an endless knife A, which is preferably of circular contour in plan; but other shapes may be employed, if desired. This knife has a continuous cutting edge $a$, and it is preferably composed of steel. Extended diametrically across the knife A and connected to its upper edge is an arched brace A', which has a cylindrical extension $A^2$ formed integral therewith, said extension having a handle B, connected to its outer end. Within this said extension $A^2$ is a squared opening $a'$. Engaging this said opening is a squared spindle C, which forms part of a bifurcated brace C', forming part of an endless knife $C^2$. This knife is of smaller diameter than the knife A, and it is concentric with said knife A.

The knife $C^2$ may be used in conjunction with the knife A when the two knives are on the same level, as illustrated by full lines in the drawings, or it may be placed out of active use, as illustrated by dotted lines, Fig. 2 of the drawings. As a means for locking the knife $C^2$ in desired position the spindle C is provided with concavities $c$, which engage the inner end of a set-screw D, which is threaded through the upright $A^2$.

In the operation and use of the invention when it is desired to use the device as a chopper the knives are placed in relative position illustrated by full lines of the drawings, whereby the full cutting-surface is brought to bear upon the product to facilitate the operation of chopping. The device may also be used in this shape to cut ring-shaped cakes.

When it is desired to cut a disk of dough equal to the diameter of the larger knife, the smaller knife is placed in position illustrated by dotted lines, Fig. 2 of the drawings. The smaller knife may also be used independently for cutting biscuits or cakes of small diameter by simply disconnecting it from the part $A^2$ of the larger knife.

Having thus described my invention, what I claim as new, and desire to secure by Letters Patent, is—

In a combined chopper and cutter, the combination with the blade A, formed with the arched brace A', and the tubular extension $A^2$; of the inner knife $C^2$, concentric with the said knife A, formed with the bifurcated brace C', and spindle C, indented with pits $c$, and arranged to engage, and pass through the hollow of the cylindrical extension $A^2$; a handle B, upon the upper end of said cylindrical extension; and the set-screw D, threaded in said cylindrical extension $A^2$, and engaging the pits $c$, in said spindle C, all substantially as and for the purpose set forth.

In testimony that I claim the foregoing as my invention I have signed my name, in presence of two witnesses, this 2d day of May, 1901.

JOHN ADDISON BONE.

Witnesses:
 CROMLINE LODI FOWLER,
 CHARLES RICHARDS DILLEY.